United States Patent [19]
Bailey et al.

[11] 3,808,012
[45] Apr. 30, 1974

[54] DENSE COMPOSITE CERAMIC BODIES

[75] Inventors: Wallace O. Bailey, Westland, Mich.; Carl H. McMurtry, Lewiston; Bruno R. Miccioli, North Tonawanda, both of N.Y.

[73] Assignee: The Carborundum Company, Niagara Falls, N.Y.

[22] Filed: Apr. 19, 1971

[21] Appl. No.: 135,392

[52] U.S. Cl. .................................. 106/44, 51/307
[51] Int. Cl. ...................... C04b 35/56, C04b 35/58
[58] Field of Search ............ 106/43, 44, 55, 56, 46; 252/516, 520; 51/307, 308

[56] References Cited
UNITED STATES PATENTS

| | | | |
|---|---|---|---|
| 2,546,142 | 3/1951 | Watson | 106/55 X |
| 3,153,636 | 10/1964 | Shanta et al. | 106/43 X |
| 3,175,918 | 3/1965 | McGahan et al. | 106/43 X |
| 3,143,413 | 8/1964 | Krapf | 106/43 X |
| 3,065,088 | 11/1962 | Janes et al. | 106/44 |
| 2,529,333 | 11/1950 | Finlay | 106/43 |
| 3,705,112 | 12/1972 | Nienort | 252/520 |

FOREIGN PATENTS OR APPLICATIONS

| | | | |
|---|---|---|---|
| 38-7645 | 5/1963 | Japan | 106/56 |

*Primary Examiner*—Donald J. Arnold
*Attorney, Agent, or Firm*—David E. Dougherty; Herbert W. Mylius

[57] ABSTRACT

Hard, dense composite ceramic bodies of titanium diboride, boron carbide, silicon carbide and silicon, having a wide variety of utilities, are produced by forming a mixture of titanium diboride, boron carbide and a temporary binder into a desired shape to obtain a coherent green body which is siliconized by heating it in contact with silicon to a temperature above the melting point of silicon, whereupon the molten silicon infiltrates the body and reacts with some of the boron carbide therein to produce silicon carbide in situ.

9 Claims, No Drawings

DENSE COMPOSITE CERAMIC BODIES

SUMMARY OF THE INVENTION

The present invention relates to hard, dense, i.e., substantially nonporous composite ceramic materials consisting essentially of titanium diboride, boron carbide, silicon carbide and silicon, and to a method for the production of such composite ceramic materials. In accordance with the method of the invention, hard, dense bodies of such composite ceramic materials may be readily produced in any of a wide variety of shapes without resorting to hot pressing, which is disadvantageous in being relatively expensive and in being limited to the production of relatively simple shapes.

Briefly, the method of the invention comprises preparing a substantially homogeneous initial mixture of granular titanium diboride and granular boron carbide in a proportion of from about 5:95 to about 95:5 and a temporary binder; forming the initial mixture into a desired shape by pressing, extruding, investment or slip casting or any other suitable method; setting the temporary binder, if necessary, to impart sufficient coherence to the shaped green body to permit further processing; and siliconizing the coherent green body by heating it in contact with silicon to a siliconizing temperature above the melting point of silicon. Thereupon, the silicon in the molten state, infiltrates the body and undergoes a rather complex reaction with some of the boron carbide, producing some silicon carbide in situ. The titanium diboride apparently does not undergo any reaction. To the extent that interstices exist in the body between the titanium diboride, the remaining boron carbide and the newly-formed silicon carbide, the interstitial space is permeated by free silicon. The silicon carbide and free silicon bond the other materials and an extremely hard and dense body is formed.

The temporary binder employed may be such as to be completely dissipated during the siliconizing heating cycle; or it may be a carbonizable material which will leave a carbon residue in the body upon heating, in which case the silicon will also react with substantially all of the residual carbon to produce silicon carbide, and accordingly the resulting body will generally have a somewhat higher silicon carbide content and a somewhat lower free silicon content. The same result may be obtained by incorporating in the initial mixture a small amount, i.e., up to about 10 percent of the combined weight of the titanium diboride and boron carbide, of finely divided carbon of any suitable variety such as powdered graphite. If desired, both finely divided carbon and a carbonizable binder may be included in the initial mixture.

The hard dense composite ceramic bodies produced in accordance with the foregoing method consist essentially of from about 2 percent to about 80 percent titanium diboride, from about 2 to about 70 percent boron carbide, from about 5 to about 30 percent silicon carbide, and from about 3 to about 20 percent free silicon, the precise composition of a given body depending primarily upon the composition of the initial mixture. Such composite bodies have a specific gravity within the range from about 2.6 to about 4.1, increasing with increasing titanium diboride content. The proportion of titanium diboride to boron carbide in the initial mixture must be at least about 5:95 so that sufficient titanium diboride is present in the final body to impart its desirable properties thereto; and the proportion must not exceed about 95:5 so that sufficient boron carbide is present in the green body to react with the silicon and produce silicon carbide.

In addition to being hard and dense, the composite ceramic bodies of the invention possess many other desirable properties, being refractory, tough, wear-resistant, abrasion-resistant, and resistant to most acids and alkalis. The oxidation resistance of the bodies tends to increase with increasing titanium diboride content, bodies of high titanium diboride content having particularly outstanding oxidation resistance. These desirable properties render the bodies of the invention, in suitable shapes, useful in a wide variety of wear-resistant and other applications, including, for example, extrusion dies, sandblast nozzles, cutting tool tips, abrasives, suction box covers for paper-making machines and the like. The bodies are characterized by a high Young's modulus of elasticity ranging from about $3 \times 10^6$ kg./sq. cm. to about $4 \times 10^6$ kg./sq. cm. which, together with their other desirable properties, renders the bodies, in suitable shapes, highly useful as personnel, vehicular and aircraft armor. It has also been found that the bodies of the invention, especially those having a relatively high titanium diboride content, are quite electrically conductive and extremely resistant to corrosion by molten aluminum and aluminum alloys, thus they find utility as current conducting elements for use in contact with molten aluminum and alloys thereof, such as electrodes for refining aluminum. They also find utility as various parts of pumps used for pumping molten aluminum and alloys thereof, such as pistons, cylinders, impellers, bearings, and the like.

Titanium diboride itself is known to be electrically conductive, resistant to molten aluminum, and to possess desirable properties as a ceramic armor material. Accordingly, in order to avail of these properties when the bodies of the invention are to be used in armor or aluminum applications, it is preferred that the proportion of titanium diboride to boron carbide in the initial mixture be at least about 65:35; and it is also preferred, especially for armor, that this proportion not exceed about 85:15, so that sufficient boron carbide is present to result in the production of enough silicon carbide to contribute to a particularly strong bonding phase. The preferred composite bodies of the invention are produced from initial mixtures containing titanium diboride and boron carbide in this preferred range of proportions, and consist essentially of from about 45 to about 75 percent titanium diboride, from about 10 to about 30 percent boron carbide, from about 8 to about 30 percent silicon carbide, and from about 3 to about 20 percent free silicon. Such composite bodies have a specific gravity within the range from about 3.1 to about 3.8, being sufficiently light to be useful as armor even in many applications where light weight is an important factor.

DESCRIPTION OF PREFERRED EMBODIMENTS

The invention will now be described in greater detail partly with reference to the following examples, which are intended to illustrate, and not to limit the scope of, the invention.

EXAMPLE 1

A mixture is prepared consisting of 8,500 g. of granular titanium diboride having a particle size of 45 microns and finer and 1,500 g. of granular boron carbide comprising 45 percent with a median particle size of 100 microns and ranging from 70 microns to 140 microns, 23 percent with a median particle size of 65 microns ranging from 40 microns to 100 microns, and 32 percent with a particle size of 10 microns and finer. Thereto is added 1,100 g. of a temporary carbonizable binder consisting of 600 g. of a liquid thermosetting phenol-formaldehyde resin of the kind typified by that sold by Varcum Chemical Division of Reichhold Chemicals, Inc. under the trade name Varcum B–178 and 500 g. of furfural, the latter also serving to add plasticity to the mix. The mixture is blended until it is substantially homogeneous and the resulting mix, or initial mixture, is passed through a coarse screen to break up any agglomerates. An 1,800 g. quantity of the mix is placed in a steel mold 9 inches square (22.8 cm. square) and compressed at 6,000 psi. (420 kg./sq. cm.) to form a plate 9 inches square by 0.82 inch (2.08 cm.) thick. The piece is placed in an oven and heated at 60°C for 16 hours, at 100°C for 24 hours, and finally at 180°C for 24 hours, to set the temporary binder, the resulting coherent green body having a specific gravity of 2.85.

The green body is placed on a graphite supporting plate in the chamber of an induction heated furnace, and 1,530 g. of granular silicon is distributed evenly over the surface of the green body. The furnace chamber is evacuated to a pressure of about 50 microns of mercury, and the power source to the induction coils of the furnace is turned on. The reduced pressure is maintained throughout the heating cycle. An optical pyrometer sighted on the piece is used to ascertain the temperature of the piece as the temperature rises. The temperature of the piece is brought to 1,470°C; the silicon melts, and the molten silicon infiltrates the piece quite abruptly and reacts with some of the boron carbide and with substantially all of the residual carbon from the binder to produce silicon carbide. The power is immediately turned off and the furnace and its contents are permitted to cool to room temperature.

The ceramic plate thus produced has a specific gravity of 3.5, an electrical resistivity of $5 \times 10^{-4}$ ohm-cm., a flexural strength of 1,400 kg./sq. cm., a Young's modulus of elasticity of $3.4 \times 10^6$ kg./sq. cm., and a shear modulus of $1.7 \times 10^6$ kg./sq. cm. Elemental analysis for total titanium, total boron, and free silicon indicates that the piece consists essentially of 66 percent titanium diboride, 12 percent boron carbide, 11 percent silicon carbide, and 11 percent free silicon. X-ray diffraction analysis using monochromatic copper K-alpha radiation indicates that the boron carbide present is of two types, the first type having a diffraction pattern corresponding to normal $B_4C$, and the second type having a diffraction pattern of boron carbide with an expanded lattice, this second type apparently being a boron carbide type solid solution. The x-ray diffraction analysis also indicates the presence of titanium diboride, silicon carbide, and free silicon. The material exhibits excellent oxidation resistance, a portion of the plate showing substantially no weight change upon exposure to air at 1,000°C for 125 hours. No effect is observed upon immersion of a portion of the plate in molten aluminum at 700°C for 100 hours, the same result being obtained when the aluminum is replaced with an aluminum alloy containing 3.5 percent copper, 7.5–9.5 percent silicon and 0.1–0.5 percent magnesium or with an aluminum alloy containing 1.6 percent copper, 2.5 percent magnesium, 5.6 percent zinc and 0.3 percent chromium. The effectiveness of the piece as armor is evidenced by the fact that it successfully resists a 0.50 caliber steel core armor piercing projectile fired at point blank range.

EXAMPLE 2

A mixture is prepared consisting of 55.5 kg. of granular titanium diboride having a particle size of 45 microns and less and 23.8 kg. of granular boron carbide having a particle size of 10 mircons and less. Thereto is added 5.6 kg. of a noncarbonizable temporary binder consisting of a polyethylene glycol having an average molecular weight of 6,000 to 7,500 of the kind typified by that sold by Union Carbide Corp. under the trade name Carbowax 6,000. Approximately 4 l. of methanol is added to the mixture to dissolve the binder and aid the dispersion of the granular materials therein. The mixture is blended until it is substantially homogeneous and the methanol is allowed to evaporate. The mix is then passed through a coarse screen to break up any agglomerates.

A 2,850 g. quantity of the screened mix is placed in a 9 inch square (22.8 cm. square) mold and pressed at 6,000 psi. (420 kg./cm. sq.) to form a coherent green body 0.895 inch (2.27 cm.) thick having a specific gravity of 2.4. The body is then siliconized as as described in Example 1, employing 2,420 g. of granular silicon and a temperature of 1,500°C. The resulting plate has a specific gravity of 3.2, a Young's modulus of elasticity of $3.5 \times 10^6$ kg./sq. cm., a flexural strength of 1,400 kg./sq. cm., and an electrical resistivity of $1 \times 10^{-3}$ ohm-cm. The piece is substantially the same as that produced in Example 1 with respect to armor capability, oxidation resistance, and resistance to aluminum and aluminum alloys. Elemental analysis indicates that the piece consists essentially of 50.7 percent titanium diboride, 21.8 percent boron carbide, 13.5 percent silicon carbide and 14 percent free silicon.

EXAMPLE 3

A mixture is prepared consisting of 10 g. of granular titanium diboride having a particle size of 45 microns and less and 90 g. of granular boron carbide having the same range of particle sizes as that employed in Example 1. Thereto is added 11 g. of the same carbonizable temporary binder as employed in Example 1 and the materials are mixed until a substantially homogeneous initial mixture is formed. The mix is passed through a coarse screen to break up any agglomerates.

A 10 g. portion of the screened mix is placed in a steel mold 3 inches (7.6 cm.) long and 0.5 inch (1.27 cm.) wide and compressed at about 4,000 psi. (280 kg./sq. cm.) into a bar 0.25 inch (0.64 cm.) thick. The binder is set by heating the piece for 16 hours at 100°C and for 16 hours at 180°C. The resulting coherent green body has a specific gravity of 1.8. The piece is siliconized as described in Example 1, employing 8.5 g. of granular silicon, a vacuum of about 100 microns, and a temperature of 1,560°C.

The resulting plate or tile has a specific gravity of 2.85, and it has a Young's modulus of elasticity of $3.4 \times 10^6$ kg./sq. cm., which is comparable to that of the pieces produced in Examples 1 and 2, indicating that it would be equally suitable for use as armor. Elemental analysis indicates that the piece consists essentially of 6.3 percent titanium diboride, 56.7 percent boron carbide, 24 percent silicon carbide and 13 percent free silicon.

EXAMPLE 4

A mixture is prepared consisting of 90 g. of granular titanium diboride having a particle size of 45 microns and less and 10 g. of granular boron carbide having the same range of particle sizes as that employed in Example 1. Thereto is added 11 g. of the same carbonizable temporary binder as employed in Example 1, and the materials are mixed until substantially homogeneous. The mix is passed through a coarse screen to break up any agglomerates.

A 16 g. portion of the initial mixture is placed in a mold having the same dimensions as that employed in Example 3 and compressed at 4,000 psi. (280 kg./sq. cm.) to a bar 0.25 inch (0.64 cm.) thick. The binder is cured as in Example 3, the resulting coherent green body having a specific gravity of 2.80. The piece is siliconized as in Example 3, employing 13.6 g. of granular silicon. The resulting ceramic tile has a specific gravity of 3.54, and a Young's modulus of elasticity of $3.5 \times 10^6$ kg./sq. cm. which indicates its suitability for use as armor. Elemental analysis indicates that the piece consists essentially of 71.1 percent titanium diboride, 7.9 percent boron carbide, 8 percent carbide and 13 percent free silicon.

Dense bodies may be prepared according to the invention from an initial mixture containing titanium diboride and boron carbide grain of a single, uniform particle size. However, green bodies formed from such mixtures have considerably more interstitial space unoccupied by titanium diboride and boron carbide than bodies formed from mixtures containing particles of varying sizes, and therefore tend to have a comparatively high free silicon content after siliconization. While this is often unobjectionable, for certain applications it may be desirable to reduce or minimize the free silicon content. As already noted, a useful expedient is to employ a carbonizable binder and/or carbon in the initial mixture. Whether or not this is done, however, it is usually preferred to employ titanium diboride of varying grainsizes, or boron carbide of varying grain sizes, and preferably both as in the examples, the variety being such as to permit dense packing in accordance with known principles, thus tending to maximize the specific gravity of the green body and the siliconized body and to reduce the volume of interstitial space available for occupancy by free silicon. Composite bodies containing as little as about 3 percent free silicon can be produced by suitably selecting the grain sizes in addition to providing carbon in the green body.

In general, the finer the boron carbide, the more reactive it is. Accordingly, it is often desirable to employ at least some boron carbide which is very fine, i.e., 10 microns and finer, and there is seldom any advantage to using boron carbide having a particle size greater than about 150 microns. The titanium diboride does not appear to undergo any reaction, and there is no critical upper limit of particle size; but when certain shaping techniques such as extrusion are to be employed, it is often desirable to employ relatively fine titanium diboride having a particle size of about 125 microns or less, the same being true of the boron carbide in such cases.

The temporary binder may be selected from among a wide variety of materials recognized as suitable for such use, for example, polyethylene glycols and methoxypolyethylene glycols such as those sold by Union Carbide Corp. under the trademark Carbowax, polyvinyl alcohol, and where a carbonizable binder is desired, phenolformaldehyde and other phenolic resins, epoxy resins, dextrin, starches and the like.

The binder is employed in an amount sufficient to give an initial mixture which is of the proper consistency for forming into the desired shape by the method to be employed. Even if the binder is of the carbonizable type, this amount is usually established without regard to the amount of carbon present therein, since finely divided carbon can be incorporated in the initial mixture in an amount sufficient to provide the total quantity of carbon desired in the green body at the time of siliconization. However, it is usually preferred that the carbonizable binder have a high carbon content so that as much of the carbon as possible comes from this source, such carbon generally being more finely divided and dispersed than the carbon added to the initial mix.

After the ingredients of the initial mixture have been blended together to form a substantially homogeneous mixture which, if necessary, is passed through a coarse screen to break up any agglomerates, the mixture is formed into the desired shape and the binder is set, if necessary, to produce a coherent green body.

A particular advantage of the method of the invention lies in the fact that any of a wide variety of methods may be employed to shape the mix, and any of a wide variety of simple or complex shapes may thereby be obtained. The method of choice will depend primarily upon the shape desired. The composition of the initial mixture may be varied, especially in respect of the binder and the particle sizes of the titanium diboride and boron carbide, to obtain the most suitable mix for the particular method of forming to be employed. As illustrated in the examples, relatively simple shapes such as flat tiles may readily be produced by compression molding, preferably using sufficient pressure to obtain substantially maximum specific gravity in the green body to reduce the interstitial space to a minimum. Impact molding and ramming may be employed to form complex solid shapes, slip casting and investment casting also being useful to form complex shapes such as armor helmets, armor leg sections, armor vest sections, etc. Tubes, rods and the like may be readily formed by extrusion. Extrusion may also be employed to produce a fine strand of the initial mixture, which may be cut into short lengths to produce grain which may be siliconized to obtain abrasive grain.

When the initial mixture has been formed into the desired shape, the binder is set, if necessary, to obtain a coherent green body, under conditions suited to the particular binder material employed. Binders such as polyvinyl alcohol, polyethylene glycols and methoxypolyethylene glycols require no setting, although evaporation of the solvent may be necessary if one is employed. To set binders such as phenol-formaldehyde resins, curing of the resin is usually carried out by employing a heating cycle such as illustrated in the examples, the temperature being increased gradually or stepwise to permit gradual dissipation of the volatiles that are produced during curing without cracks being formed in the body. The coherent green body should have at least adequate strength to permit further handling and processing, and preferably should be strong enough to permit machining, if desired.

Instead of, or in addition to, incorporating carbon and/or a carbonizable binder in the initial mixture, carbon may be incorporated in the coherent green body by impregnating it with a carbonizable material such as a phenolic resin, which, upon subsequent heating, produces carbon, which reacts with the silicon during siliconization thereby reducing the proportion of free silicon in the final body.

When a binder of the noncarbonizable type is employed, it is merely dissipated by the heat during the siliconization step. When a carbonizable binder is employed, the binder in the coherent green body may be carbonized by heating the body to a sufficiently high temperature to effect carbonization. Since volatiles are dissipated from the body during carbonization, it may be desirable to control the carbonizing heating cycle by providing for a slow rate of temperature increase to permit the escape of the volatiles without cracking the body. The need for such control tends to increase with increasing size and thickness of the body. As may be seem from the examples, no specific temperature control is required under the conditions there set forth for bodies of the described dimensions; and while carbonization may, if desired, be carried out as a separate step, it is usually most conveniently accomplished during the siliconizing heating cycle.

Siliconization of the green body is effected by heating it in contact with silicon to a temperature above the melting point of silicon, whereupon the silicon in the molten state infiltrates the body and reacts with some of the boron carbide therein and with substantially all of the carbon present, if any, producing silicon carbide in situ, the reactions being very rapid. If desired, the green body may simply be immersed in molten silicon for a brief time until the body is heated to the required temperature, whereupon infiltration and reaction occur, but this technique usually results in a siliconized body coated with silicon, which is extremely difficult to remove. Preferably, therefore, the siliconization is carried out as described in the examples, by placing the green body in a suitable furnace with the appropriate amount of granular silicon spread upon the top of the body, or alternatively, by placing the green body on a bed of the appropriate amount of silicon in a crucible.

Preferably, the amount of silicon employed is carefully controlled. When too little silicon is used, the core of the body remains unsiliconized, although this may not be important for some uses of the bodies, such as certain wear-resistant applications in which only the surface properties of the bodies are of significance. Conversely, when too much silicon is employed, the excess tends to build up on the outside of the piece as a coating which is extremely difficult, although possible, to remove. The precise amount of silicon to be used for a given piece cannot be computed with exactitude, since it is impossible to precisely predict the extent of the reaction between the silicon and the boron carbide and the amount of silicon carbide that will be produced thereby. It is also difficult or impossible to predict how much free silicon will be present in the siliconized body. However, a reasonably close approximation of the requisite amount of silicon can be made by subtracting the measured specific gravity of the coherent green body from the approximate desired specific gravity of the siliconized body and multiplying by the volume of the body, thus computing the weight of silicon needed to give the desired weight increase, assuming as is true that there is no appreciable change in the dimensions of the green body upon siliconization. The precise optimum amount of silicon is best determined experimentally for a green body of given dimensions specific gravity and composition, using the calculated approximation as a starting point which is subject to modification and further experimental refinement.

Preferably, the siliconization is carried out in a nonoxidizing atmosphere such as argon, helium, neon or the like, and still more preferably in a vacuum, in order to avoid oxidation of the titanium diboride and boron carbide in the body. Vacuum is especially preferred, since it aids in the removal of any air trapped within the piece and thereby hastens infiltration of the silicon. Therefore, the higher the vacuum, the better, pressures below about 1 mm. of mercury being preferred, and pressures below about 100 microns of mercury being still more preferred.

While siliconization temperatures greatly in excess of the melting point, though below the boiling point, of silicon may be used, there is generally no advantage in doing so, and it is preferred to use the lowest possible temperature in order to minimize the time required. When the body has attained the desired temperature, it may be held there for a period of time, if desired, but such holding is unnecessary.

The composition and structure of the composite bodies of the invention appear to be quite complex. Elemental analysis and x-ray diffraction analysis of the bodies produced in Examples 1–4 and of other bodies produced in accordance with the invention indicate that the bodies invariably consist essentially of titanium diboride, boron carbide, silicon carbide and free silicon. X-ray diffraction indicates that the boron carbide is almost always of two types, both types having a boron carbide type rhombohedral structure, but one having a diffraction pattern corresponding to normal $B_4C$, and the other having a diffraction pattern of boron carbide with an expanded lattice and being of less determinate composition but containing at least boron and carbon and possibly some silicon. The latter type is usually present in but small amounts when the siliconization is carried out at a temperature only slightly above the melting point of silicon and without holding the piece at the siliconization temperature, tending to increase in amount with increasing siliconization temperature and holding time, and being present to the virtual exclusion of the normal type under extreme siliconization conditions. It is also generally observed that the percentage of free silicon present in the final body decreases with increasing temperature and holding time during siliconization, a corresponding increase in silicon carbide content also being observed. In addition to being dependent upon the precise composition of the initial mixture, the composition of the siliconized bodies also depends upon the degree of porosity present in the green body. Relatively high porosity green bodies tend to result in siliconized bodies having a relatively high concentration of free silicon, the titanium diboride and boron carbide concentrations being somewhat reduced and the silicon carbide concentration likewise being slightly reduced in general. The converse effect is observed with relatively low porosity green bodies. Minor impurities such as iron and calcium which may be present in the granular silicon, boron carbide and/or titanium diboride employed may also be present in the composite bodies.

Percentages and proportions referred to herein are percentages and proportions by weight, except as otherwise expressly stated or clearly indicated by the context.

While the invention has been described herein with reference to certain examples and preferred embodiments, it is to be understood that various changes and modifications may be made by those skilled in the art without departing from the concept of the invention, the scope of which is to be determined by reference to the following claims.

We claim:

1. A dense, composite ceramic body consisting essentially of and in percent by weight from about 2 percent to about 80 percent titanium diboride, from about 2 to about 70 percent boron carbide the mixture of titanium diboride and boron carbide being a minimum of 50 to a maximum of 92 percent, from about 5 to about 30 percent silicon carbide formed in situ, and from about 3 to about 20 percent free silicon, said free silicon occupying interstices between said titanium diboride, boron carbide, and silicon carbide.

2. A dense, composite ceramic body as set forth in claim 1 consisting essentially of and in percent by weight from about 45 to about 75 percent titanium diboride, from about 10 to about 30 percent boron carbide the mixture of titanium diboride and boron carbide being a minimum of 50 to a maximum of 92 percent, from about 8 to about 30 percent silicon carbide, and from about 3 to about 20 percent free silicon.

3. A ceramic body as set forth in claim 1 wherein said boron carbide, by x-ray diffraction, consists at least in part of a boron carbide type having an expanded lattice.

4. A ceramic body as set forth in claim 2 wherein said boron carbide, by x-ray diffraction, consists at least in part of a boron carbide type having an expanded lattice.

5. A ceramic body as set forth in claim 3 having a specific gravity within the range from about 2.6 to about 4.1.

6. A ceramic body as set forth in claim 4 having a specific gravity within the range from about 3.1 to about 3.8.

7. A ceramic body as set forth in claim 5 having a Young's modulus of elasticity within the range from about $3 \times 10^6$ kg./sq. cm. to about $4 \times 10^6$ kg./sq. cm.

8. Abrasive grain consisting essentially of bodies as set forth in claim 1, said bodies being granular.

9. An electrode for aluminum refining comprising a body as set forth in claim 1.

* * * * *